//

3,148,198
3,17-BISOXYGENATED 16α,16β-DIFLUORO-
ANDROSTENES AND PROCESS
Arthur H. Goldkamp, Glencoe, Ill., assignor to G. D.
Searle & Co., Chicago, Ill., a corporation of Delaware
No Drawing. Filed Sept. 6, 1960, Ser. No. 53,888
3 Claims. (Cl. 260—397.3)

The present invention is concerned with novel 16,16-bishalogenated steroids and with a method for their preparation. More particularly, these novel steroids are 3,17-bisoxygenated 16α,16β-difluoroandrost-4-enes as represented by the structural formulae

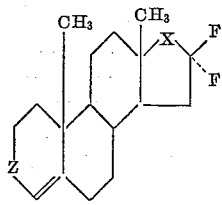

and

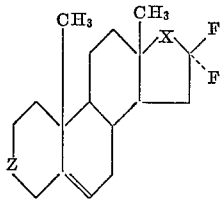

wherein X and Z are members of the class comprising carbonyl and β-hydroxymethylene radicals.

A starting material suitable for the manufacture of the instant compounds is 3β-hydroxyandrost-5-en-17-one. This ketone is converted to an enamine, for example by treatment with 4-methylpiperidine, as shown below:

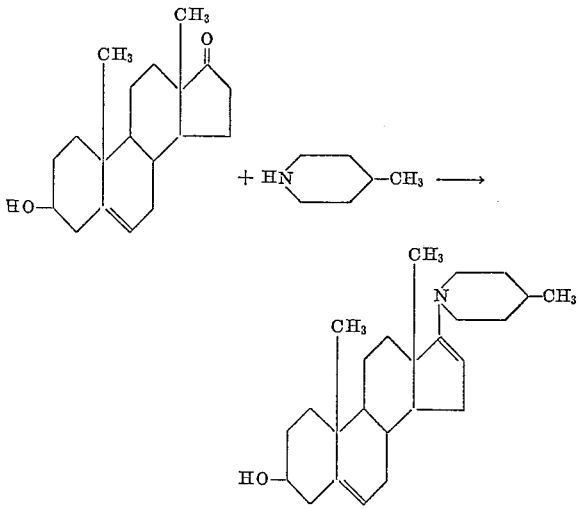

Reaction of this enamine with perchloryl fluoride results in the instant 16α,16β-difluoro-3β-hydroxyandrost-5-en-17-one. Other secondary amines from which the intermediate enamine can be prepared are those containing alkyl, aralkyl, and heterocycloaliphatic groups, and are exemplified by piperidine and pyrrolidine, together with the C-alkyl derivatives thereof. The difluorination step can be conducted at temperatures of 0–25°, the preferred operating range being 0–5°.

The aforementioned 16α,16β-difluoro-3β-hydroxyandrost-5-en-17-one, upon oxidation, typically in acetone with aqueous chromic acid, affords 16α,16β-difluoroandrost-5-ene-2,17-dione, which is isomerized to 16α,16β-difluoroandrost-4-ene-3,17-dione by brief heating with dilute sulfuric acid in methanol. Reduction of the latter diketone, suitably with sodium borohydride in aqueous ethanol, produces the corresponding 3,17β-diol, which is a mixture of the 3α- and 3β-isomers. This crude mixture can be separated chromatographically into its isomeric components. Oxidation of the crude 16α, 16β-difluoroandrost-4-ene-3,17β-diol, for example by means of manganese dioxide in chloroform, results in 16α, 16β-difluoro-17β-hydroxyandrost-4-en-3-one.

The compounds of this invention exhibit valuable pharmacological properties. They display hormone-like activity, for example, as evidenced by their androgenic properties.

The following examples are given by way of illustration only and are not to be construed as limiting the invention in spirit or in scope. Temperatures are given in degrees centigrade (°C.), and quantities of materials in parts by weight unless otherwise noted.

Example 1

A solution of 50 parts of 3β-hydroxyandrost-5-en-17-one in 65 parts of 4-methylpiperidine is heated at reflux for about 22.5 hours. A tube which is fitted with a cold-finger type condenser, the lower portion of which is packed with calcium carbide covered with glass wool, is placed in the system in order to remove water from the cooled condensate prior to its return to the reaction mixture. Approximately 860 parts of dry xylene is added, and the resulting mixture is concentrated to dryness in vacuo.

The latter residue is dissolved in about 700 parts of benzene, and this mixture is cooled to 0–5° with vigorous stirring, then treated with gaseous perchloryl fluoride for about 15 minutes. Approximately 220 parts of saturated aqueous ammonium chloride is added, and the resulting mixture is stirred for about 16 hours. The benzene layer is separated, washed successively with dilute sulfuric acid, dilute aqueous potassium hydroxide, and water, dried over anhydrous sodium sulfate, and concentrated to dryness in vacuo. This residue is chromatographed on silica gel, and the column is eluted successively with benzene and 10% ethyl acetate in benzene. The latter eluate yields a fraction, which is again chromatographed on silica gel, and the column is eluted successively with benzene and benzene-ethyl acetate mixtures. From the 10% ethyl acetate in benzene eluate is obtained a fraction, which is recrystallized from benzene-petroleum ether to afford pure 16α,16β-difluoro-3β-hydroxyandrost-5 - en - 17 - one, M.P. about 158–159.5°; $[\alpha]_D = +27.8°$ (chloroform).

Example 2

To a stirred solution of 2.05 parts of 16α,16β-difluoro-3β-hydroxyandrost-5-en-17-one in 160 parts of acetone is added, with cooling, 1.7 parts of an aqueous solution containing 0.46 part of chromium trioxide and 0.71 part of concentrated sulfuric acid. Dilution of the reaction mixture with ice-cold water results in precipitation of the product, which is collected by filtration and dried to afford 16α,16β-difluoroandrost-5-ene-3,17-dione, M.P. about 148–151°. This diketone displays infrared maxima at about 5.62 and 5.82 microns.

Example 3

To a solution of 1.5 parts of 16α,16β-difluoroandrost-5-ene-3,17-dione in 40 parts of methanol is added a solution of 2 parts of concentrated sulfuric acid in 10 parts of water, and the resulting mixture is heated on the steam bath for about 15 minutes. The reaction mixture is cooled and diluted with ice-cold water to effect precipitation of the crude product, which is collected by filtration and dried, then recrystallized from methylene chloride-ether to produce pure 16α,16β-difluoroandrost-4-ene-3,17-dione, M.P. about 180–182°. This substance exhibits a maximum in the ultraviolet at about 239.3 millimicrons with a molecular extinction coefficient of about 16,800.

*Example 4*

To a solution of 0.5 part of sodium borohydride in 5 parts of water and 8 parts of ethanol is added, with stirring and cooling, a solution of one part of 16α,16β-difluoroandrost-4-ene-3,17-dione in 8 parts of ethanol. Stirring is continued for about 5 minutes, and the reaction mixture is diluted with water and extracted with methylene chloride. The organic extract is dried over anhydrous sodium sulfate, then concentrated in vacuo to afford 16α,16β-difluoroandrost-4-ene-3,17β-diol.

Chromatography of the latter 3,17β-diol on silica gel followed by elution with 30–50% ethyl acetate in benzene affords 16α,16β-difluoroandrost-4-ene-3β,17β-diol.

*Example 5*

To a solution of one part of 16α,16β-difluoroandrost-4-ene-3,17β-diol in 145 parts of chloroform is added 10 parts of powdered manganese dioxide, and the resulting suspension is stirred at room temperature for about 2 hours. The inorganic salts are removed by filtration, and the solvent is evaporated from the filtrate to produce a residue, which is chromatographed on silica gel. The column is eluted with benzene and benzene-ethyl acetate mixtures. The 10% ethyl acetate in benzene eluate affords a fraction which is recrystallized from methylene chloride-ether-petroleum ether to yield pure 16α,-16β - difluoro-17β-hydroxyandrost-4-en-3-one, M.P. about 156–159°. This compound is further characterized by an ultraviolet absorption maximum at about 240 millimicrons with a molecular extinction coefficient of about 16,200.

What is claimed is:
1. 16α,16β-difluoroandrost-5-ene-3,17-dione.
2. 16α,16β-difluoroandrost-4-ene-3,17β-diol.
3. A process for the manufacture of 16α,16β-difluoro-3β-hydroxyandrost-5-en-17-one, which comprises contacting 3β-hydroxyandrost-5-en-17-one first with a secondary amine, then with perchloryl fluoride.

References Cited in the file of this patent
UNITED STATES PATENTS

| | | |
|---|---|---|
| 2,831,872 | Fried et al. | Apr. 22, 1958 |
| 2,857,403 | Fried et al. | Oct. 21, 1958 |
| 2,961,441 | Bogert et al. | Nov. 22, 1960 |

OTHER REFERENCES

Nakanishi et al.: Chem. and Ind., Sept. 3, 1960, pages 1136–1137.